(12) United States Patent
Tokuda et al.

(10) Patent No.: US 12,237,495 B2
(45) Date of Patent: Feb. 25, 2025

(54) SECONDARY BATTERY

(71) Applicant: Panasonic Intellectual Property Management Co., Ltd., Osaka (JP)

(72) Inventors: Yuki Tokuda, Osaka (JP); Hideharu Takezawa, Nara (JP); Yuko Ogawa, Osaka (JP); Hiroyuki Okuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/140,877

(22) Filed: Apr. 28, 2023

(65) Prior Publication Data

US 2023/0275208 A1 Aug. 31, 2023

Related U.S. Application Data

(62) Division of application No. 16/771,394, filed as application No. PCT/JP2018/039806 on Oct. 26, 2018, now Pat. No. 11,677,064.

(30) Foreign Application Priority Data

Dec. 25, 2017 (JP) .................... 2017-248310

(51) Int. Cl.
*H01M 4/13* (2010.01)
*H01M 10/0525* (2010.01)
(Continued)

(52) U.S. Cl.
CPC ......... *H01M 4/13* (2013.01); *H01M 10/0525* (2013.01); *H01M 10/0587* (2013.01);
(Continued)

(58) Field of Classification Search
CPC ...... H01M 50/10; H01M 50/50; H01M 50/53; H01M 50/531; H01M 4/13
See application file for complete search history.

(56) References Cited

U.S. PATENT DOCUMENTS

2006/0003221 A1 1/2006 Yeo
2006/0222937 A1 10/2006 Morimoto et al.
(Continued)

FOREIGN PATENT DOCUMENTS

CN 201087907 Y 7/2008
CN 203733894 U 7/2014
(Continued)

OTHER PUBLICATIONS

International Search Report dated Dec. 18, 2018, issued in counterpart Application No. PCT/JP2018/039806 (2 pages).
(Continued)

*Primary Examiner* — Kenneth J Douyette
(74) *Attorney, Agent, or Firm* — WHDA, LLP

(57) ABSTRACT

An electrode group includes a positive electrode, a negative electrode, a separator interposed between the positive electrode and the negative electrode, and a positive electrode lead electrically connected to the positive electrode. The positive electrode includes a positive electrode current collector and a positive electrode active material layer carried on each main surface of the positive electrode current collector. The positive electrode current collector has an exposed section that does not carry the positive electrode active material layer. The negative electrode includes a negative electrode current collector and a negative electrode active material layer carried on each main surface of the negative electrode current collector and has a first region and a second region. The mass of the negative electrode active material layer in the first region per unit area is smaller than (Continued)

the mass of the negative electrode active material layer in the second region per unit area.

5 Claims, 4 Drawing Sheets

(51) Int. Cl.
　　　*H01M 10/0587*　　(2010.01)
　　　*H01M 50/531*　　(2021.01)
　　　*H01M 50/534*　　(2021.01)
　　　*H01M 50/536*　　(2021.01)
　　　*H01M 50/586*　　(2021.01)
　　　*H01M 50/595*　　(2021.01)

(52) U.S. Cl.
　　　CPC ....... *H01M 50/531* (2021.01); *H01M 50/534* (2021.01); *H01M 50/536* (2021.01); *H01M 50/586* (2021.01); *H01M 50/595* (2021.01)

(56) References Cited

U.S. PATENT DOCUMENTS

| | | |
|---|---|---|
| 2011/0027636 A1 | 2/2011 | Lee et al. |
| 2011/0217577 A1 | 9/2011 | Fukui et al. |
| 2015/0207111 A1 | 7/2015 | Tao et al. |
| 2017/0309951 A1 | 10/2017 | Ishikawa et al. |

FOREIGN PATENT DOCUMENTS

| | | |
|---|---|---|
| CN | 204905336 U | 12/2015 |
| JP | 1-272047 A | 10/1989 |
| JP | 2003-068271 A | 3/2003 |
| JP | 2004-311282 A | 11/2004 |
| JP | 2011-204660 A | 10/2011 |
| WO | 2013/038676 A1 | 3/2013 |
| WO | 2016/121339 A1 | 8/2016 |

OTHER PUBLICATIONS

Search Report dated Sep. 28, 2023, issued in counterpart CN Application No. 201880084007.2. (2 pages).

SECONDARY BATTERY

CROSS REFERENCE TO RELATED APPLICATIONS

This application is a Division of U.S. patent application Ser. No. 16/771,394, filed Jun. 10, 2020 now U.S. Pat. No. 11,677,064, which is a National Stage Entry of International Application No. PCT/JP2018/039806 filed Oct. 26, 2018, which claims the benefit of Japanese Patent Application No. 2017-248310 filed in the Japan Patent Office on Dec. 25, 2017, each of which is incorporated by reference herein in its entirety.

TECHNICAL FIELD

The present invention relates to a secondary battery including a wound electrode group.

BACKGROUND ART

A secondary battery may include a wound electrode group formed by winding a positive electrode and a negative electrode which are disposed so as to face each other with a separator therebetween. The positive electrode includes a positive electrode current collector and a positive electrode active material layer carried by the positive electrode current collector. The positive electrode current collector has an exposed section that does not have the positive electrode active material layer. The exposed section is connected to one end of a positive electrode lead in the longitudinal direction. The other end of the positive electrode lead is connected to a positive electrode terminal of the battery. The positive electrode and the positive electrode terminal are electrically connected to each other through the positive electrode lead (PTL 1).

CITATION LIST

Patent Literature

PTL 1: International Publication No. 2016/121339

SUMMARY OF INVENTION

A wound electrode group to which a positive electrode lead is joined tends to form an elliptical shape in which a positive electrode lead joint section protrudes. The battery case has a bottom surface with a substantially perfect circle shape. A large space is thus left between the battery case and the electrode group in the minor axis direction, which prevents effective use of the inner space of the battery case and makes it difficult to increase the capacity.

A secondary battery according to the present disclosure includes an electrode group and an electrolyte. The electrode group includes a positive electrode, a negative electrode, a separator interposed between the positive electrode and the negative electrode, and a positive electrode lead electrically connected to the positive electrode. The positive electrode and the negative electrode are disposed so as to face each other with the separator therebetween, and are wound. The positive electrode includes a positive electrode current collector and a positive electrode active material layer carried on each main surface of the positive electrode current collector. The positive electrode current collector has a first exposed section that does not carry the positive electrode active material layer. The positive electrode lead is connected to the exposed section. The negative electrode includes a negative electrode current collector and a negative electrode active material layer carried on each main surface of the negative electrode current collector and has a first region and a second region. The mass of the negative electrode active material layer in the first region per unit area is smaller than the mass of the negative electrode active material layer in the second region per unit area. The first region faces the positive electrode lead.

A secondary battery according to the present disclosure includes an electrode group and an electrolyte. The electrode group includes a positive electrode, a negative electrode, a separator interposed between the positive electrode and the negative electrode, and a positive electrode lead electrically connected to the positive electrode. The positive electrode and the negative electrode are disposed so as to face each other with the separator therebetween, and are wound. The positive electrode includes a positive electrode current collector and a positive electrode active material layer carried on each main surface of the positive electrode current collector. The positive electrode current collector has a first exposed section that does not carry the positive electrode active material layer. The positive electrode lead is connected to the first exposed section. The negative electrode includes a negative electrode current collector and a negative electrode active material layer carried on each main surface of the negative electrode current collector and has a first region and a second region. The negative electrode current collector is exposed in the first region. The first region faces the positive electrode lead.

In the secondary battery according the present disclosure, the wound electrode group has a cross section with a substantially perfect circle shape. This feature enables effective use of the inner space of the battery case and provides a high-capacity secondary battery.

DESCRIPTION OF EMBODIMENTS

Figure 1:
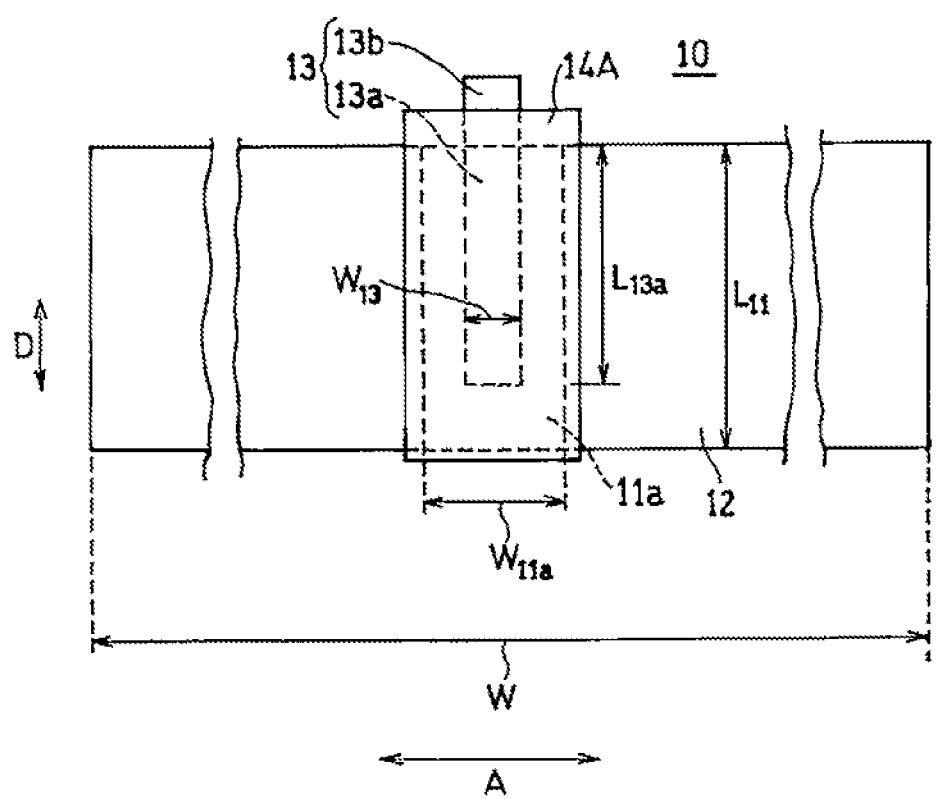
FIG. 1 is a plan view of a band-shaped positive electrode used in a secondary battery according to an embodiment.

A secondary battery according to an embodiment (hereinafter may be referred to simply as a battery) includes an electrode group and an electrolyte. The electrode group includes a positive electrode, a negative electrode, a separator interposed between the positive electrode and the negative electrode, and a positive electrode lead electrically connected to the positive electrode. The electrode group is a wound electrode group formed by winding a positive electrode and a negative electrode which are disposed so as to face each other with a separator therebetween.

The positive electrode includes a positive electrode current collector and a positive electrode active material layer carried on each main surface of the positive electrode current collector. The positive electrode current collector has a first exposed section that does not carry the positive electrode active material layer. The positive electrode lead is connected to the first exposed section.

The negative electrode includes a negative electrode current collector and a negative electrode active material layer carried on each main surface of the negative electrode current collector and has a first region and a second region. The mass of the negative electrode active material layer in the first region per unit area is smaller than the mass of the negative electrode active material layer in the second region per unit area. The first region may carry no negative electrode active material layer. The negative electrode current collector may be exposed in the first region. The first region faces the positive electrode lead. The positive electrode lead is located within the first region.

The mass of the negative electrode active material layer per unit area affects only the thickness of the negative electrode active material layer. A region having a small mass of the negative electrode active material layer per unit area can deform under a small stress. The negative electrode active material layer in the first region in the electrode group is pressed by the facing positive electrode lead and thus thinner than the negative electrode active material layer in the second region. The first region may be thinner than the second region when the first region is not pressed by the facing positive electrode lead. At least part of the thickness of the positive electrode lead is absorbed in the first region which is thin, and the cross-sectional shape of the electrode group perpendicular to the winding axis direction (hereinafter referred to simply as the cross-sectional shape of the electrode group) becomes close to perfect circle. This feature enables effective use of the inner space of the battery case and provides high capacity.

In a preferred aspect, the battery includes a first insulating member that covers the positive electrode lead. In this case, a boundary between the first region and the second region in the cross section exposed by cutting the positive electrode lead at right angles to the winding axis direction of the electrode group may be positioned between an end of the positive electrode lead and an end of the first insulating member. Since the positive electrode active material layer which contributes to charging and discharging faces the second region in which the negative electrode active material layer is disposed, the secondary battery can be stably charged and discharged. In a more preferred aspect, the first insulating member covers the first exposed section. In this case, a boundary between the first region and the second region may be positioned between an end of the positive electrode lead and an end of the first exposed section.

The components of the secondary battery will be described below in detail. In this embodiment, a lithium-ion secondary battery is illustrated as an example. The present disclosure is not limited to the lithium-ion secondary battery.

(Positive Electrode)

The positive electrode includes a positive electrode current collector and positive electrode active material layers carried by the positive electrode current collector. The positive electrode current collector includes a first main surface and a second main surface on the opposite side of the first main surface. The positive electrode active material layers are carried on the first main surface and the second main surface. The first main surface of the positive electrode current collector has a first exposed section that does not have the positive electrode active material layer. The positive electrode lead is electrically connected to the first exposed section. The positive electrode lead is covered by the first insulating member.

The second main surface of the positive electrode current collector may have an exposed section (second exposed section) that is disposed so as to correspond to the first exposed section and that does not carry the positive electrode active material layer. This configuration facilitates welding between the positive electrode lead and the positive electrode current collector. In this case, at least part of the second exposed section is also covered by an insulating member (second insulating member).

Examples of the positive electrode current collector includes a sheet-shaped conductive material (e.g., metal foil). Examples of the metal for forming metal foil include aluminum, aluminum alloys, stainless steel, titanium, and titanium alloys. The thickness of the positive electrode current collector may be, for example, 1 μm to 100 μm, or may be 10 μm to 50 μm.

The positive electrode active material layer contains a positive electrode active material, a conductive agent, a binder, and the like. The positive electrode active material is a material that can be doped and dedoped with lithium ions and is, for example, a lithium-containing composite oxide. Examples of the lithium-containing composite oxide include $LiCoO_2$, $LiMn_2O_4$, $LiNiO_2$, $LiN_{x1}Mn_{y1}Co_{1-(x1+y1)}O_2$, $LiNi_{x2}Co_{y2}M_{1-(x2+y2)}O_2$, $\alpha LiFeO_2$, and $LiVO_2$. Here, x1 and y1 respectively satisfy $0.25 \leq x \leq 0.6$ and $0.25 \leq y1 \leq 0.5$, x2 and y2 respectively satisfy $0.75 \leq x2 \leq 0.99$ and $0.01 \leq y2 \leq 0.25$, and M is at least one element selected from the group consisting of Na, Mg, Sc, Y, Ti, V, Cr, Fe, Cu, Ag, Zn, Al, Ga, In, Sn, Pb, and Sb.

Examples of the conductive agent contained in the positive electrode active material layer include carbon black, graphite, and carbon fiber. The amount of the conductive agent is, for example, 0 to 20 parts by mass per 100 parts by mass of the positive electrode active material. Examples of the binder contained in the positive electrode active material layer include fluorocarbon resins, such as polytetrafluoroethylene (PTFE) and polyvinylidene fluoride; acrylic resins; and rubbers (rubber particles), such as styrene-butadiene rubber (SBR). The amount of the binder is, for example, 0.5 to 15 parts by mass per 100 parts by mass of the positive electrode active material.

The positive electrode active material layer is formed as follows: kneading, together with a dispersion medium, a positive electrode mixture containing a positive electrode active material, a binder, a conductive agent, and the like to prepare a positive electrode paste; applying the positive electrode paste to a predetermined region of the surface of the positive electrode current collector; and drying and rolling the formed layer. The dispersion medium is, for example, an organic solvent or water. The organic solvent is not limited. Examples of the organic solvent include N-methyl-2-pyrrolidone (NMP). The application of the positive electrode paste can be performed by using various coaters. The drying after application may be natural drying or may be heat drying. The mass of the positive electrode active material layer per unit area on one surface may be, for example, 100 g/m² to 800 g/m², or may be 450 g/m² to 600 g/m². The thickness of the positive electrode active material layer may be, for example, 50 μm to 200 μm, or may be 60 μm to 150 μm.

Examples of the material of the positive electrode lead include aluminum, aluminum alloys, nickel, nickel alloys, iron, and stainless steel. The thickness of the positive electrode lead may be, for example, 10 μm to 200 μm, or may be 100 μm to 150 μm. The thickness of the positive electrode lead may be smaller than the thickness of the positive electrode active material layer or may be larger than or equal to the thickness of the positive electrode active material layer. In particular, when the thickness of the positive electrode lead is larger than the thickness of an end of the positive electrode active material layer adjacent to the first exposed section, the advantageous effects of this embodiment tend to be exerted.

The insulating members (the first insulating member and the second insulating member) are, for examples, tapes each including a substrate and an adhesive layer.

The substrate may be made of resin since resin is easily available and inexpensive. The type of resin is not limited as long as the resin has appropriate elasticity, flexibility, and insulation. Examples of the resin include polyimide, polyamide (e.g., aromatic polyamide), polyamide-imide, polyolefin (e.g., polypropylene (PP)), polyester (e.g., polyethylene naphthalate), polyphenylsulfone (PPS), and polyphenylene sulfide. These resins may be used alone or in combination of two or more.

The thickness of the substrate may be, for example, 5 μm to 100 μm, or may be 10 μm to 50 μm in view of handleability and flexibility.

The adhesive layer contains a binder.

Various resin materials can be used as the binder. Examples of resin materials include acrylic resin, natural rubber, synthetic rubber (e.g., butyl rubber), silicone, epoxy resin, melamine resin, and phenolic resin. These resin materials may be used alone or in combination of two or more. As necessary, the binder may contain additives, such as a tackifier, a cross-linking agent, an anti-aging agent, a coloring agent, an antioxidant, a chain transfer agent, a plasticizer, a softener, a surfactant, and an antistatic agent, and a small amount of solvent.

To easily ensure high adhesion and easily design the tape, the thickness of the adhesive layer may be 2 μm to 30 μm, or may be 5 μm to 15 μm.

FIG. 1 is a plan view of a band-shaped positive electrode used in the secondary battery.

A band-shaped positive electrode 10 includes a positive electrode current collector and a positive electrode active material layer 12 carried on each main surface of the positive electrode current collector. A first main surface of the positive electrode current collector has a first exposed section 11a which does not carry the positive electrode active material layer 12. A second main surface of the positive electrode current collector may have a second exposed section 11b (see FIG. 3) which does not carry the positive electrode active material layer 12. The first exposed section 11a and the second exposed section 11b are arranged at positions corresponding to each other. Hereinafter, the first exposed section 11a and the second exposed section 11b may be collectively referred to as exposed sections.

The shape of the exposed sections is not limited. The exposed sections each have, for example, a slit shape in such a manner that the positive electrode current collector is exposed from one end to the other end in a direction (hereinafter referred to as a winding axis direction D) intersecting with the winding direction A of the positive electrode current collector. The exposed sections are formed by, for example, intermittently applying the positive electrode paste to the positive electrode current collector. The exposed sections may be formed by removing part of the positive electrode active material layers 12 from the positive electrode 10. These slit-shaped exposed sections are formed, for example, at an angle of 80 to 100 degrees to the winding direction A of the electrode group.

The length (width $W_{11a}$) of the first exposed section 11a in the winding direction A is not limited and depends on the length (width $W_{13}$) of a positive electrode lead 13 in the winding direction A. The length $W_{11a}$ of the first exposed section 11a may be 120% to 1000% of the width $W_{13}$ of the positive electrode lead 13. The width $W_{11a}$ of the first exposed section 11a is, for example, 3 mm to 20 mm, and may be 5 mm to 16 mm. The length (width) of the second exposed section 11b in the winding direction A is similar to the width $W_{11a}$ of the first exposed section 11a.

Part of the strip-shaped positive electrode lead 13 is welded to the first exposed section 11a. The positive electrode lead 13 includes a first section 13a and a second section 13b. The first section 13a overlaps the first exposed section 11a, and the second section 13b protrudes from the first exposed section 11a.

The length $L_{13a}$ of the first section 13a depends on the battery size. The length $L_{13a}$ is, for example, 10 mm to 60 mm, and may be 5% to 100% or 20% to 95% of the length $L_{11}$ of the positive electrode current collector in the winding axis direction D. The length $L_{13a}$ is, for example, 10 mm to 60 mm. The length $L_{13a}$ is a distance from the boundary between the first section 13a and the second section 13b to a position in the first section 13a farthest from the boundary. The overall size of the strip-shaped positive electrode lead 13 is not limited and is, for example, 2 mm to 8 mm wide and 20 mm to 80 mm long.

The first exposed section 11a is preferably formed in a region other than the end portions of the positive electrode current collector in the winding direction A. The first exposed section 11a is located, for example, at a distance of 20% or more of the length of the positive electrode current collector in the winding direction A from both ends of the positive electrode current collector in the winding direction A. In this case, in the electrode group, the first section 13a of the positive electrode lead 13 is supported from both sides by the facing negative electrode, and the second section 13b protrudes from an inner region of the electrode group. This configuration reduces the resistance.

A first insulating member 14A preferably covers the entire surface of the first exposed section 11a. To prevent an internal short circuit, the first insulating member 14A may cover end portions of the positive electrode active material layer 12. An end portion of the second section 13b adjacent to the first section 13a may also be covered by the first insulating member 14A. An end portion of the second section 13b that is adjacent to the first section 13a and located on the second main surface side may also be covered by an insulating member.

(Negative Electrode)

The negative electrode includes a negative electrode current collector and a negative electrode active material layer carried on each main surface of the negative electrode current collector and has a first region and a second region. The mass of the negative electrode active material layer in the first region per unit area is smaller than the mass of the negative electrode active material layer in the second region per unit area. In the first region, the negative electrode current collector may be exposed. The first region faces the first section 13a of the positive electrode lead 13.

Examples of the negative electrode current collector includes a sheet-shaped conductive material (e.g., metal foil). Examples of the metal for forming metal foil include copper, copper alloys, nickel, nickel alloys, and stainless steel. The thickness of the negative electrode current collector may be, for example, 1 μm to 100 μm, or may be 2 μm to 50 μm.

The negative electrode active material layer contains a negative electrode active material, a binder, and the like. The negative electrode active material is a material that can be doped and dedoped with lithium ions. Examples of the negative electrode active material include carbon materials (various graphites, such as natural graphite and synthetic graphite, mesocarbon microbeads, hard carbon), transition metal compounds that can be doped and dedoped with lithium ions at a voltage lower than that of the positive electrode, and alloy materials. Examples of alloy materials include silicon, silicon compounds, such as silicon oxide, silicon alloys, tin, tin oxide, and tin alloys. These negative electrode active materials may be used alone or in combination of two or more.

Examples of the binder contained in the negative electrode active material layer include fluorocarbon resins, acrylic resins, rubbers (rubber particles), and cellulose resins (e.g., carboxymethyl cellulose (CMC)). The amount of the binder is, for example, 0.5 to 15 parts by mass per 100 parts by mass of the negative electrode active material.

The negative electrode active material layer is formed as follows: kneading, together with a dispersion medium, a negative electrode mixture containing a negative electrode active material, a binder, and the like to prepare a negative electrode paste; applying the negative electrode paste to a predetermined region of the surface of the negative electrode current collector; and drying and rolling the formed layer. The dispersion medium is an organic solvent, water, or the like as in the positive electrode paste. The application of the negative electrode paste can be performed in the same manner as in the positive electrode. The mass of the negative electrode active material layer per unit area in the second region may be, for example, 50 g/m$^2$ to 500 g/m$^2$, or may be 100 g/m$^2$ to 350 g/m$^2$. The thickness of the negative electrode active material layer in the second region may be, for example, 70 μm to 250 μm, or may be 100 μm to 200 μm.

The first region is formed by applying the negative electrode paste to the negative electrode current collector while changing the application amount. The first region may be formed by removing part of the negative electrode active material layer from the negative electrode.

The negative electrode current collector normally has an exposed section (third exposed section) that does not have the negative electrode active material layer. For example, a strip-shaped negative electrode lead is connected to the third exposed section.

Examples of the material of the negative electrode lead include copper and/or nickel, and an alloy thereof.

Figure 2:
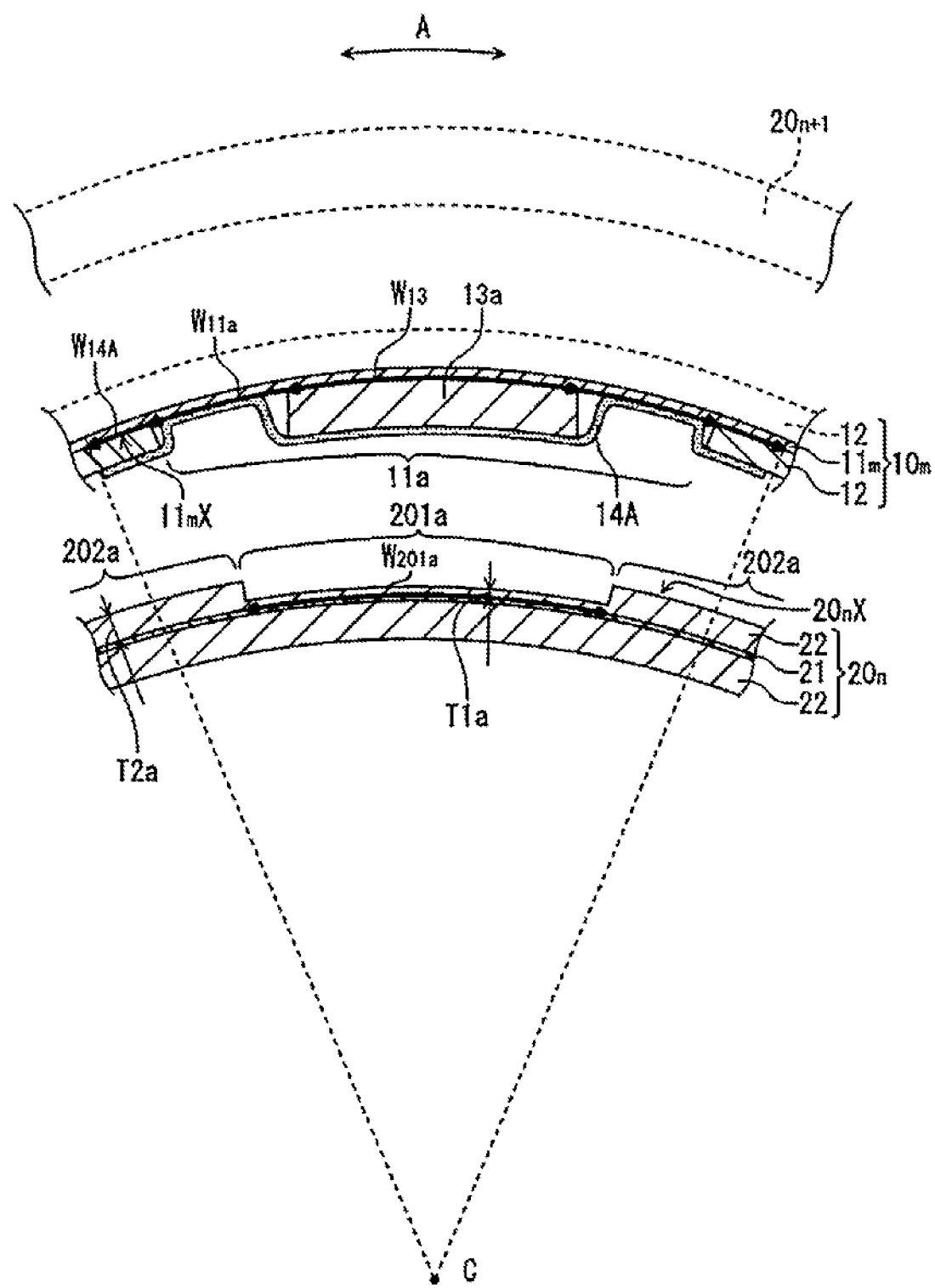
FIG. 2 is an enlarged cross-sectional view of main parts of an electrode group according to a first aspect.
Figure 3:
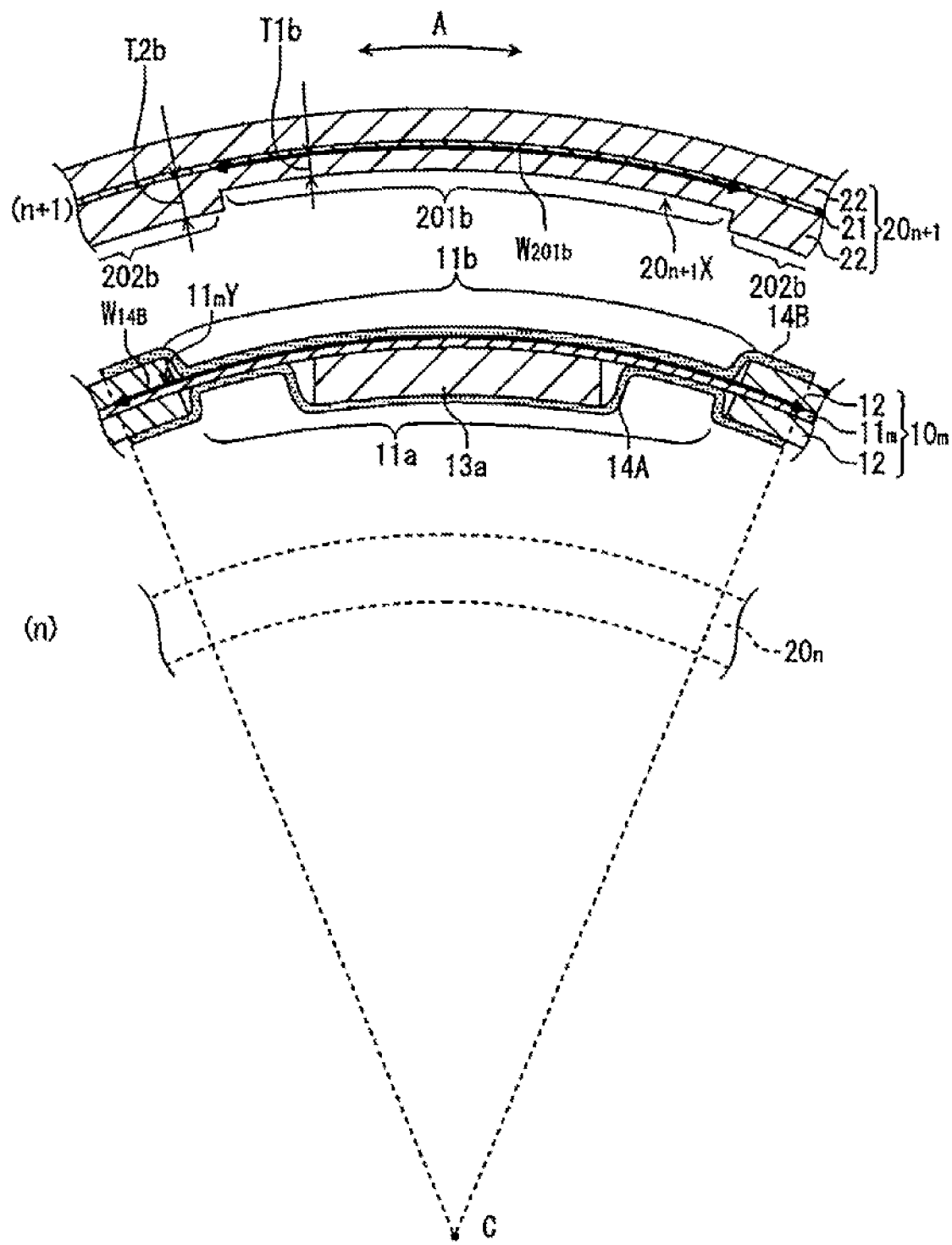
FIG. 3 is an enlarged cross-sectional view of main parts of an electrode group according to a second aspect.

FIG. 2 and FIG. 3 are enlarged cross-sectional views of main parts of the electrode group. In FIG. 2 and FIG. 3, the first section 13a of the positive electrode lead is located in a positive electrode $10_m$ (m≥1) between a negative electrode $20_n$ wound nth (n≥1) from the center of the electrode group and a negative electrode $20_{n+1}$ wound (n+1)th from the center of the electrode group. A first main surface $11_mX$ of the positive electrode current collector $11_m$ to which the positive electrode lead is joined faces the negative electrode $20_n$ wound nth.

In FIG. 2 and FIG. 3, the first exposed section 11a and the first section 13a are covered by the first insulating member 14A. The first insulating member 14A may also cover part of the positive electrode active material layer 12. In FIG. 2 and FIG. 3, the separator is emitted for convenience, the positive electrode 10 and the negative electrode $20_n$ are drawn at a distance from each other, and the positive electrode 10 and the negative electrode $20_{n+1}$ are drawn at a distance from each other.

A first region 201a and a second region 202a in FIG. 2 are located on a main surface $20_nX$ which faces a first main surface $11_mX$ of a positive electrode current collector $11_m$. The first region 201a faces the first section 13a of the positive electrode lead with the separator (not shown) and the first insulating member 14A therebetween. A negative electrode active material layer 22 in the first region 201a is thinner than the negative electrode active material layer 22 in the second region 202a due to the stress from the first section 13a of the positive electrode lead. Hereinafter, the aspect illustrated in FIG. 2 is defined as a first aspect.

A first region 201b and a second region 202b in FIG. 3 are located on a main surface $20_{n+1}X$ which faces a second main surface $11_mY$ of a positive electrode current collector $11_m$. The positive electrode current collector $11_m$ has a second exposed section 11b which is disposed so as to correspond to the first exposed section 11a and which does not carry the positive electrode active material layer 12. The second exposed section 11b is covered by a second insulating member 14B. In other words, the first region 201b faces the first section 13a of the positive electrode lead with the separator (not shown), the second insulating member 14B, and the positive electrode current collector $11_m$ therebetween. The negative electrode active material layer 22 in the first region 201b is thinner than the negative electrode active material layer 22 in the second region 202b due to the stress from the first section 13a of the positive electrode lead. Hereinafter, the aspect illustrated in FIG. 3 is defined as a second aspect.

The position of the first section 13a of the positive electrode lead is not limited, and the first section 13a may be located on a surface adjacent to the negative electrode $20_{n+1}$ wound (n+1)th. In other words, the first main surface $11_mX$ of the positive electrode current collector $11_m$ may face the negative electrode $20_{n+1}$ wound (n+1)th. In this case, the first region 201a is located on a main surface that faces a first main surface $11_mX$ of the negative electrode $20_{n+1}$ wound (n+1)th. The first region 201b is located on a main surface that faces the first main surface $11_mX$ of the negative electrode $20n$ wound nth.

[First Aspect]

In the aspect illustrated in FIG. 2, the first region 201a and the second region 202a are located on the main surface $20_nX$ which faces the first main surface $11_mX$ of the positive electrode current collector $11_m$. The first region 201a faces the first section 13a of the positive electrode lead with the separator and the first insulating member 14A therebetween. The thickness T1a of the negative electrode active material layer 22 in the first region 201a is smaller than the thickness T2a of the negative electrode active material layer 22 in the second region 202a. In the first region 201a, a negative electrode current collector 21 may be exposed.

The thickness T1a and the thickness T2a refer to the thickness of the negative electrode active material layer 22 carried on the main surface $20_nX$ of the negative electrode current collector 21. The thickness T1a and the thickness T2a are the means of the thickness at freely selected 3 positions. The thickness T1b and the thickness T2b described below are obtained in the same manner.

In the cross section exposed by cutting the positive electrode lead in the direction (i.e., in the winding direction A) perpendicular to the winding axis direction D, the first region 201a faces the first section 13a of the positive electrode lead. The first section 13a of the positive electrode lead is located within the first region 201a having the thin negative electrode active material layer 22 in the electrode group. Thus, at least part of the thickness of the first section 13a of the positive electrode lead is absorbed in the first region 201a, and the cross-sectional shape of the electrode group becomes close to perfect circle.

A boundary between the first region 201a and the second region 202a may be positioned between an end of the first section 13a of the positive electrode lead and an end of the first insulating member 14A or may be positioned between an end of the first section 13a of the positive electrode lead and an end of the first exposed section 11a. In the latter case, the edge of the second region 202a is located so as to face a thin region (first exposed section 11a) of the positive electrode 10. Thus, the cross-sectional shape of the electrode group becomes close to perfect circle.

As long as the mass M1a of the negative electrode active material layer 22 in the first region 201a per unit area on one surface is smaller than the mass M2a of the negative electrode active material layer 22 in the second region 202a per unit area on one surface, the mass M1a is not limited and appropriately set according to the roundness of the electrode group. The mass M1a per unit area may be 80% or less or 50% or less of the mass M2a per unit area. The first region 201a may include a region that does not carry the negative electrode active material layer 22 and in which the mass M1a per unit area is 0, that is, a region in which the negative electrode current collector 21 is exposed. This is because a large part of the negative electrode active material layer 22 that faces the first insulating member 14A does not contribute to the charging and discharging reactions.

The thickness T1a of the negative electrode active material layer 22 on one surface in the first region 201a is normally smaller than the thickness T2a of the negative electrode active material layer 22 on one surface in the second region 202a. The ratio of the thickness T1a to the thickness T2a may change with the ratio of the mass M1a per unit area to the mass M2a per unit area, the stress on the first region 201a, and the like.

A difference da between the thickness T2a and the thickness T1a is preferably similar to a difference d between the thickness of the first section 13a of the positive electrode lead and the thickness of an end of the positive electrode active material layer 12 adjacent to the first exposed section 11a on one surface. This is because at least part of the difference d is absorbed in the first region 201a and the first exposed section 11a. For example, the difference da between the thickness T2a and the thickness T1a may be 20% to 125% of the difference d.

The length (width $W_{201a}$) of the first region 201a in the winding direction A is not limited as long as the boundary between the first region 201a and the second region 202a is positioned between an end of the first section 13a of the positive electrode lead and an end of the first insulating member 14A. The width $W_{201a}$ of the first region 201a may be, for example, 100% to 500% of the width $W_{13}$ of the positive electrode lead 13. The width $W_{201a}$ of the first region 201a may be, for example, 30% to 95% of the length (width $W_{14A}$) of the first insulating member 14A in the winding direction A. The width $W_{201a}$ of the first region 201a may preferably be 50% to 120% or 50% to 100% of the width $W_{11a}$ of the first exposed section 11a.

The width $W_{14A}$ of the first insulating member 14A is obtained as the length of an arc partitioned by straight lines connecting the center C of a battery case 70 (see FIG. 4) and both ends of the first insulating member 14A in the winding direction A. The length (width $W_{14B}$) of the second insulating member 14B in the winding direction A described below is obtained similarly.

[Second Aspect]

In the aspect illustrated in FIG. 3, the first region 201b and the second region 202b are located on the main surface $20_{n+1}X$ which faces the second main surface $11_mY$ of the positive electrode current collector $11_m$. The positive electrode current collector $11_m$ has a second exposed section 11b which is disposed so as to correspond to the first exposed section 11a and which does not carry the positive electrode active material layer 12. The second exposed section 11b is covered by the second insulating member 14B. In other words, the first region 201b faces the first section 13a of the positive electrode lead with the separator, the second insulating member 14B, and the positive electrode current collector $11_m$ therebetween. The thickness T1b of the negative electrode active material layer 22 in the first region 201b is smaller than the thickness T2b of the negative electrode active material layer 22 in the second region 202b. In the first region 201b, the negative electrode current collector 21 may be exposed.

In the cross section exposed by cutting the positive electrode lead in the winding direction A, the first region 201b faces the first section 13a of the positive electrode lead. The first section 13a of the positive electrode lead is located within the first region 201b having the thin negative electrode active material layer 22 in the electrode group. Thus, at least part of the thickness of the first section 13a of the positive electrode lead is absorbed in the first region 201b, and the cross-sectional shape of the electrode group becomes close to perfect circle.

The boundary between the first region 201b and the second region 202b may be positioned between an end of the first section 13a of the positive electrode lead and an end of the second insulating member 14B or may be positioned between an end of the first section 13a of the positive electrode lead and an end of the first exposed section 11a. In the latter case, the edge of the second region 202b is located so as to face a thin region (first exposed section 11a) of the positive electrode 10. The cross-sectional shape of the electrode group is thus close to perfect circle.

The boundary between the first region 201b and the second region 202b may be set on the basis of the position of the first insulating member 14A. This is because the first insulating member 14A and the second insulating member 14B are arranged so as to substantially correspond to each other.

A region of the positive electrode current collector 11 covered by the second insulating member 14B may carry the thin positive electrode active material layer 12 or, as illustrated in FIG. 3, may have the second exposed section 11b in which the positive electrode current collector $11_m$ is exposed. In the latter case, the boundary between the first region 201b and the second region 202b is preferably positioned so as to face the second exposed section 11b. This is because the cross-sectional shape of the electrode group becomes close to perfect circle.

As long as the mass M1b of the negative electrode active material layer 22 in the first region 201b per unit area on one surface is smaller than the mass M2b of the negative electrode active material layer 22 in the second region 202b per unit area on one surface, the mass M1b is not limited and appropriately set according to the roundness of the electrode group. The mass M1b per unit area may be 80% or less or 50% or less of the mass M2b per unit area. The first region 201b may include a region that does not carry the negative electrode active material layer 22 and in which the mass M1b per unit area is 0, that is, a region in which the negative electrode current collector 21 is exposed. This is because a large part of the negative electrode active material layer 22 that faces the second insulating member 14B does not contribute to the charging and discharging reactions either.

The thickness T1b of the negative electrode active material layer 22 on one surface in the first region 201b is normally smaller than the thickness T2b of the negative electrode active material layer 22 on one surface in the second region 202b. The ratio of the thickness T1b to the thickness T2b may change with the ratio of the mass M1b per unit area to the mass M2b per unit area, the stress on the first region 201b, and the like.

A difference db between the thickness T2b and the thickness T1b is preferably similar to a difference d between the thickness of the first section 13a of the positive electrode lead and the thickness of an end of the positive electrode active material layer 12 on one surface. This is because at least part of the difference d is absorbed in the first region 201b and the first exposed section 11a. For example, the difference db between the thickness T2b and the thickness T1b may be 20% to 125% of the difference d.

When the first region 201a as well as the first region 201b are formed on the negative electrode 20n, the sum of the difference db between the thickness T2b and the thickness T1b and the difference da between the thickness T2a and the thickness T1a is preferably 20% to 125% of the difference d.

The length (width $W_{201b}$) of the first region 201b in the winding direction A is not limited as long as the boundary between the first region 201b and the second region 202b is positioned between an end of the first section 13a of the positive electrode lead and an end of the second insulating member 14B. The width $W_{201b}$ of the first region 201b may be, for example, 100% to 500% of the width $W_{13}$ of the positive electrode lead 13. The width $W_{201b}$ of the first region 201b may be, for example, 30% to 95% of the width $W_{14B}$ of the second insulating member 14B. The width $W_{201b}$ of the first region 201b may preferably be 50% to 120% or 50% to 100% of the width of the second exposed section 11b.

(Electrolyte)

The electrolyte is prepared by, for example, dissolving a lithium salt in water or a non-aqueous solvent. Examples of the non-aqueous solvent include cyclic carbonates, such as ethylene carbonate and propylene carbonate; chain carbonates, such as dimethyl carbonate, diethyl carbonate, and ethyl methyl carbonate; lactones, such as γ-butyrolactone; chain carboxylates, such as methyl formate and methyl acetate; halogenated alkanes, such as 1,2-dichloroethane; alkoxy alkanes, such as 1,2-dimethoxyethane; ketones, such as 4-methyl-2-pentanone; chain ethers, such as pentafluoropropyl methyl ether; cyclic ethers, such as 1,4-dioxane and tetrahydrofuran; nitriles, such as acetonitrile; amides, such as N,N-dimethylformamide; carbamates, such as 3-methyl-2-oxazolidone; sulphur-containing compounds, such as sulfoxides (e.g., sulfolane, dimethyl sulfoxide) and 1,3-propanesultone; and halogenated products formed by substituting hydrogen atoms of these solvents with halogen atoms such as a fluorine atom. These non-aqueous solvents may be used alone or in combination of two or more.

Examples of lithium salts include $LiPF_6$, $LiBF_4$, $LiAsF_6$, $LiSbF_6$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiClO_4$, $LiAlCl_4$, and $Li_2B_{10}Cl_{10}$. These lithium salts may be used alone or in combination of two or more. The concentration of the lithium salt in the electrolyte may be, for example, 0.5 to 1.7 mol/L, or may be 0.7 to 1.5 mol/L.

(Separator)

The separator may be, for example, a fine porous film made of resin, a fine porous film made of resin and having the surface coated with a heat-resistant layer, or a non-woven fabric. Examples of the resin for forming the fine porous film include polyolefin materials. Examples of polyolefin materials include polyethylene and polypropylene. The heat-resistant layer contains, for example, a heat-resistant resin and may contain a heat-resistant resin and inorganic particles. The heat-resistant layer may be porous. Examples of the heat-resistant resin include aramid, polyimide, and polyamide-imide. Examples of the inorganic particles include alumina and titania. The thickness of the separator is, for example, 5 μm to 50 μm.

Figure 4:
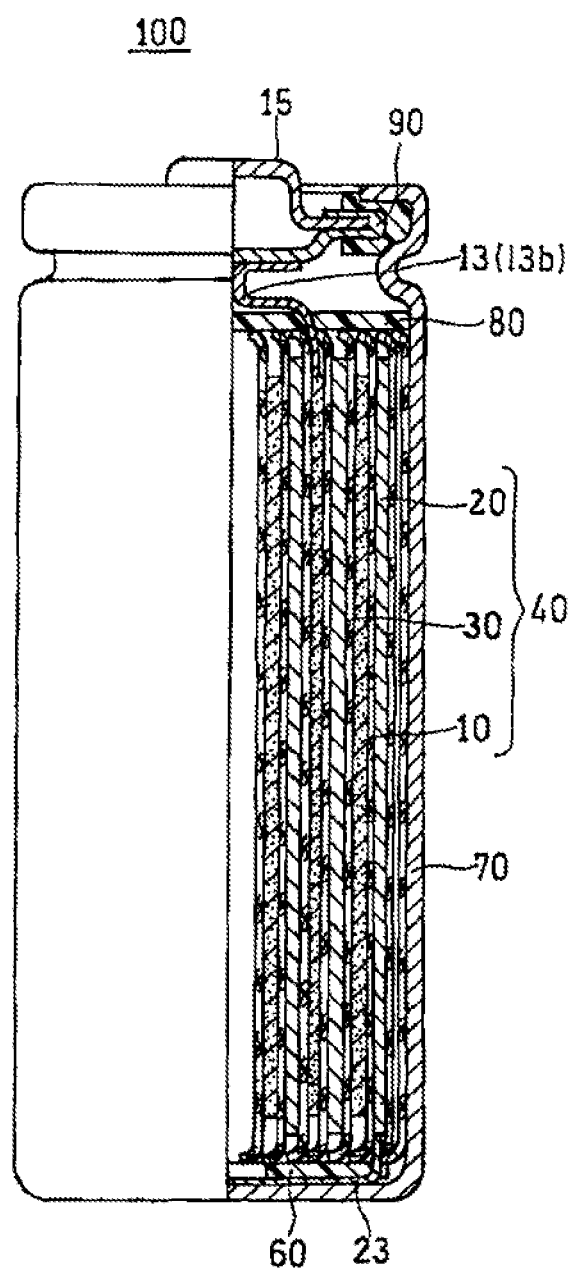
FIG. 4 is a schematic longitudinal cross-sectional view of a cylindrical secondary battery according to an embodiment.

FIG. 4 schematically illustrates the longitudinal cross-section of an example cylindrical secondary battery according to an embodiment.

A secondary battery 100 includes a wound electrode group 40 and an electrolyte (not shown). The electrode group 40 includes a band-shaped positive electrode 10, a band-shaped negative electrode 20, and a separator 30. A positive electrode lead 13 is connected to the positive electrode 10, and a negative electrode lead 23 is connected to the negative electrode 20. In the figure, only a second section 13b of the positive electrode lead 13 is illustrated, and the illustration of a first section is omitted. The illustration of insulating members is also omitted.

One end of the positive electrode lead 13 in the longitudinal direction is connected to a first exposed section of the positive electrode 10, and the other end portion is connected to a sealing plate 90. The sealing plate 90 has a positive electrode terminal 15. One end of the negative electrode lead 23 is connected to the negative electrode 20, and the other end is connected to the bottom of a battery case 70 serving as a negative electrode terminal. An upper insulating ring 80 made of resin and a lower insulating ring 60 made of resin are respectively arranged above and below the electrode group 40. The battery case 70 is a bottomed cylindrical battery can. The battery case 70 is open at one end in the longitudinal direction, and the bottom at the other end serves as a negative electrode terminal.

The present disclosure will be described below in more detail by way of Examples. It should be understood that the present disclosure is not limited to Examples described below.

Example 1

(1) Production of Positive Electrode

A positive electrode paste was prepared by mixing 100 parts by mass of $LiNi_{0.82}Co_{0.15}Al_{0.03}O_2$, which was a positive electrode active material, 1.0 part by mass of acetylene black, 0.9 parts by mass of polyvinylidene fluoride (binder), and an appropriate amount of NMP. The prepared positive electrode paste was uniformly applied to each surface of an aluminum foil, 20 μm thick, serving as a positive electrode current collector, followed by drying and rolling. A band-shaped positive electrode 58 mm wide was produced accordingly. It is noted that a slit-shaped first exposed section and a slit-shaped second exposed section in which the positive electrode current collector was exposed from one end to the other end in the winding axis direction were provided on the respective surfaces of the positive electrode near the center in the longitudinal direction of the positive electrode. The width of each exposed section was 7 mm.

A strip-shaped positive electrode lead, 3.5 mm wide and 68 mm long, made of aluminum was overlaid on the first exposed section of the positive electrode current collector and positioned such that the length of the second section was 15 mm and the length of the first section was 53 mm. In this state, the first section was welded to the first exposed section.

An insulating member (first insulating member) was attached to a first main surface of the positive electrode so as to cover the first exposed section, and an insulating member (second insulating member) was attached to a second main surface of the positive electrode so as to cover the second exposed section. Each insulating member was positioned to extend 2 mm from both ends of each exposed section in the winding axis direction of the positive electrode current collector. Each insulating member was positioned to extend 2 mm on the positive electrode active material layer. The insulating member included a polyimide substrate layer 15 μm thick and an acrylic resin-containing adhesive layer 5 μm thick.

(2) Production of Negative Electrode

A negative electrode paste was prepared by mixing 100 parts by mass of synthetic graphite flakes having a mean particle size of about 20 μm and serving as a negative electrode active material, 1 part by mass of styrene-butadiene rubber (binder), 1 part by mass of carboxymethyl cellulose (thickening agent), and water. The prepared negative electrode paste was uniformly applied to each surface of a copper foil, 8 μm thick, serving as a negative electrode current collector, followed by drying and rolling. A band-shaped negative electrode 59 mm wide was produced accordingly.

A third exposed section in which the negative electrode current collector was exposed from one end to the other end in the winding axis direction was provided on each surface in an end of the negative electrode on the winding end side. At a predetermined position of the negative electrode, a first region in which the mass of the negative electrode active material layer per unit area on one surface was 80% (=M1$a$/M2$a$) was provided so as to extend from one end to the other end of the negative electrode current collector in the winding axis direction. The width of the first region was 8 mm. The mass M2$a$ per unit area on one surface in the second region was 130 g/m$^2$.

A strip-shaped negative electrode lead, 3 mm wide and 40 mm long, made of nickel was overlaid on the third exposed section of the negative electrode current collector and positioned in the same manner as for the positive electrode. In this state, part of the negative electrode lead was welded to the third exposed section.

(3) Production of Electrode Group

An electrode group was formed by layering the positive electrode and the negative electrode with the separator therebetween, followed by winding. The thin first region of the negative electrode active material layer faced the first section of the positive electrode lead with the separator and the first insulating member therebetween, as illustrated in FIG. 2. Each of two boundaries between the first region and the second regions was positioned between an end of the first section of the positive electrode lead and an end of the first insulating member. The above boundaries faced the positive electrode active material layer with the separator and the first insulating member therebetween. As illustrated in FIG. 4, the second section of the positive electrode lead protruded from one end surface of the electrode group, and one end of the negative electrode lead protruded from the other end surface.

(4) Preparation of Electrolyte

An electrolyte was prepared by dissolving 1.4 mol/L of LiPF$_6$ in a solvent mixture of ethylene carbonate, ethyl methyl carbonate, and dimethyl carbonate (volume ratio 1:1:8).

(5) Production of Battery

The electrode group sandwiched between a lower insulating ring and an upper insulating ring was placed in a battery can (18 mm in diameter and 65 mm in height) made of iron and having the nickel-plated inner surface. The negative electrode lead was interposed between the lower insulating ring and the bottom of the battery can. The positive electrode lead was passed through a through-hole at the center of the upper insulating ring. Next, an electrode bar was passed through a hollow at the center of the electrode group and a through-hole at the center of the lower insulating ring. In this state, one end of the negative electrode lead was welded to the inner bottom surface of the battery can. The second section of the positive electrode lead extending from the through-hole of the upper insulating ring was welded to the inner surface of a sealing plate having a gasket in its peripheral portion. Subsequently, grooving was performed on an area near the opening of the battery can, and an electrolyte was injected into the battery can, so that the electrode group was impregnated with the electrolyte. Finally, the opening of the battery can was closed with the sealing plate, and the opening end portion of the battery can was crimped to the peripheral portion of the sealing plate with a gasket therebetween, producing a cylindrical secondary battery.

(6) Evaluation (a) Roundness

As the obtained electrode group was observed in the winding axis direction, the diameter (first diameter) of the electrode group on a first straight line connecting the center of the width of the first section of the positive electrode lead and the center of the battery case and the diameter (second diameter) on a second straight line intersecting with the first straight line at right angles and passing through the center of the electrode group were determined. The value (first diameter/second diameter) obtained by dividing the first diameter by the second diameter is defined as roundness and shown in Table 1.

(b) Initial Capacity

The initial discharge capacity of the obtained secondary battery was determined after repeating the charging/discharging cycle 3 times under the following conditions in a 25° C.-thermostatic bath. The design capacity of the secondary battery was 1 C. The difference between the obtained initial discharge capacity and the discharge capacity of a battery produced in Comparative Example 1 is defined as the amount of capacity improvement and shown in Table 1.

(1) Constant current charging: 0.3 C (final voltage 4.2 V)
(2) Constant voltage charging: 4.2 V (final current 0.1 C)
(3) Constant current charging: 0.5 C (final voltage 2.5 V)

Example 2

A battery was produced and evaluated in the same manner as in Example 1 except that the ratio M1$a$/M2$a$ of the mass of the negative electrode active material layer per unit area on one surface in the first region to that in the second region of the negative electrode was 50%. The results are shown in Table 1.

Example 3

A battery was produced and evaluated in the same manner as in Example 1 except that the mass M1$a$ of the negative electrode active material layer per unit area on one surface in the first region of the negative electrode was 0 (g/m$^2$) so that the negative electrode current collector was exposed. The results are shown in Table 1.

Example 4

A battery was produced and evaluated in the same manner as in Example 1 except that the first region was disposed so as to face the first section of the positive electrode lead with the separator, the second insulating member, and the positive electrode current collector therebetween as illustrated in FIG. 3. The ratio M1$b$/M2$b$ of the mass of the negative electrode active material layer per unit area on one surface in the first region to that in the second region of the negative electrode was 80%. The results are shown in Table 1.

Example 5

A battery was produced and evaluated in the same manner as in Example 4 except that the thickness T1$b$ of the negative electrode active material layer on one surface in the first region of the negative electrode was 0 so that the negative electrode current collector was exposed. The results are shown in Table 1.

Example 6

A battery was produced and evaluated in the same manner as in Example 1 except that a first region that faced the first section of the positive electrode lead with the separator and the first insulating member therebetween as illustrated in FIG. 2 and a first region that faced the first section of the positive electrode lead with the separator, the second insulating member, and the positive electrode current collector therebetween as illustrated in FIG. 3 were provided in the negative electrode adjacent to both main surfaces of the positive electrode having the positive electrode lead. The results are shown in Table 1. The mass of the negative electrode active material layer per unit area on one surface in each first region was set to satisfy M1$a$/M2$a$=80% and M1$b$/M2$b$=80%.

Example 7

A battery was produced and evaluated in the same manner as in Example 6 except that the mass M1$a$ and the mass M1$b$ of the negative electrode active material layer per unit area on one surface in the respective first regions were 0 so that the negative electrode current collector was exposed. The results are shown in Table 1.

Example 8

A battery was produced and evaluated in the same manner as in Example 2 except that the width of the first region was 5 mm and a boundary between the first region and the second region was positioned between an end of the first section of the positive electrode lead and the positive electrode active material layer. The results are shown in Table 1. The ratio M1$a$/M2$a$ satisfied M1$a$/M2$a$=50%, and the above boundary faced the first exposed section with the separator and the first insulating member therebetween.

Example 9

A battery was produced and evaluated in the same manner as in Example 8 except that the first region was disposed so as to face the first section of the positive electrode lead with the separator, the second insulating member, and the positive electrode current collector therebetween as illustrated in FIG. 3. The results are shown in Table 1. The boundary between the first region and the second region was positioned between an end of the first section of the positive electrode lead and the positive electrode active material layer and faced the second exposed section with the separator and the insulating member therebetween. The ratio M1$b$/M2$b$ satisfied M1$b$/M2$b$=50%.

Comparative Example 1

A battery was produced in the same manner as in Example 1 except that the first region was not provided. The results are shown in Table 1.

Comparative Example 2

A battery was produced and evaluated in the same manner as in Example 2 except that the width of the first region was 2 mm and the boundary between the first region and the second region was positioned so as to face the positive electrode lead. The results are shown in Table 1.

TABLE 1

| | Roundness | Amount of Capacity Improvement (mAh) |
|---|---|---|
| Example 1 | 1.012 | 4.0 |
| Example 2 | 1.005 | 4.0 |
| Example 3 | 0.991 | 4.5 |
| Example 4 | 1.015 | 3.3 |
| Example 5 | 1.008 | 4.5 |
| Example 6 | 1.010 | 4.1 |
| Example 7 | 0.985 | 3.7 |
| Example 8 | 1.002 | 5.4 |
| Example 9 | 1.003 | 5.1 |
| Comparative Example 1 | 1.038 | — |
| Comparative Example 2 | 1.036 | 0.3 |

INDUSTRIAL APPLICABILITY

The secondary battery according to the present disclosure is preferably used as a driving source for electronic devices, such as laptop computers and mobile phones, a power storage device requiring high output, and a power source for electric vehicles, hybrid cars, and power tools.

REFERENCE SIGNS LIST 10, 10$_m$ Positive electrode
11, 11$_m$ Positive electrode current collector
11$a$ First exposed section
11$b$ Second exposed section
11$_m$X First main surface
11$_m$Y Second main surface
12 Positive electrode active material layer
13 Positive electrode lead
13$a$ First section
13$b$ Second section
14A First insulating member
14B Second insulating member
15 Positive electrode terminal
20, 20$n$, 20$_{n+1}$ Negative electrode
201$a$, 201$b$ First region
202$a$, 202$b$ Second region
20$_n$X, 20$_{n+1}$X Main surface
21 Negative electrode current collector
22 Negative electrode active material layer
23 Negative electrode lead
30 Separator
40 Electrode group
60 Lower insulating ring
70 Battery case
80 Upper insulating ring 90 Sealing plate
100 Secondary battery

The invention claimed is:

1. A secondary battery comprising:
an electrode group; and an electrolyte,
wherein the electrode group includes a positive electrode, a negative electrode, a separator interposed between the positive electrode and the negative electrode, and a positive electrode lead electrically connected to the positive electrode,
the positive electrode and the negative electrode are disposed so as to face each other with the separator therebetween, and are wound,
the positive electrode includes a positive electrode current collector and a positive electrode active material layer carried on each main surface of the positive electrode current collector,
the positive electrode current collector has a first exposed section that does not carry the positive electrode active material layer,
the positive electrode lead is connected to the first exposed section,
the negative electrode includes a negative electrode current collector and a negative electrode active material layer carried on each main surface of the negative electrode current collector and has a first region and a second region,
the negative electrode current collector is exposed in the first region, and
the first region faces the positive electrode lead,
the secondary battery further comprising a first insulating member that covers the positive electrode lead,
wherein a boundary between the first region and the second region is positioned between an end of the positive electrode lead and an end of the first insulating member.

2. The secondary battery according to claim 1,
wherein the first insulating member covers the first exposed section, and
the boundary between the first region and the second region is positioned between the end of the positive electrode lead and an end of the first exposed section.

3. The secondary battery according to claim 2, wherein the first insulating member covers part of the positive electrode active material layer.

4. The secondary battery according to claim 1, wherein the first region faces the positive electrode lead with the separator and the first insulating member therebetween.

5. The secondary battery according to claim 1,
wherein the positive electrode current collector has a second exposed section that is disposed so as to correspond to the first exposed section and that does not carry the positive electrode active material layer,
the second exposed section is covered by a second insulating member, and
the first region faces the positive electrode lead with the separator, the second insulating member, and the positive electrode current collector therebetween.

* * * * *